UNITED STATES PATENT OFFICE.

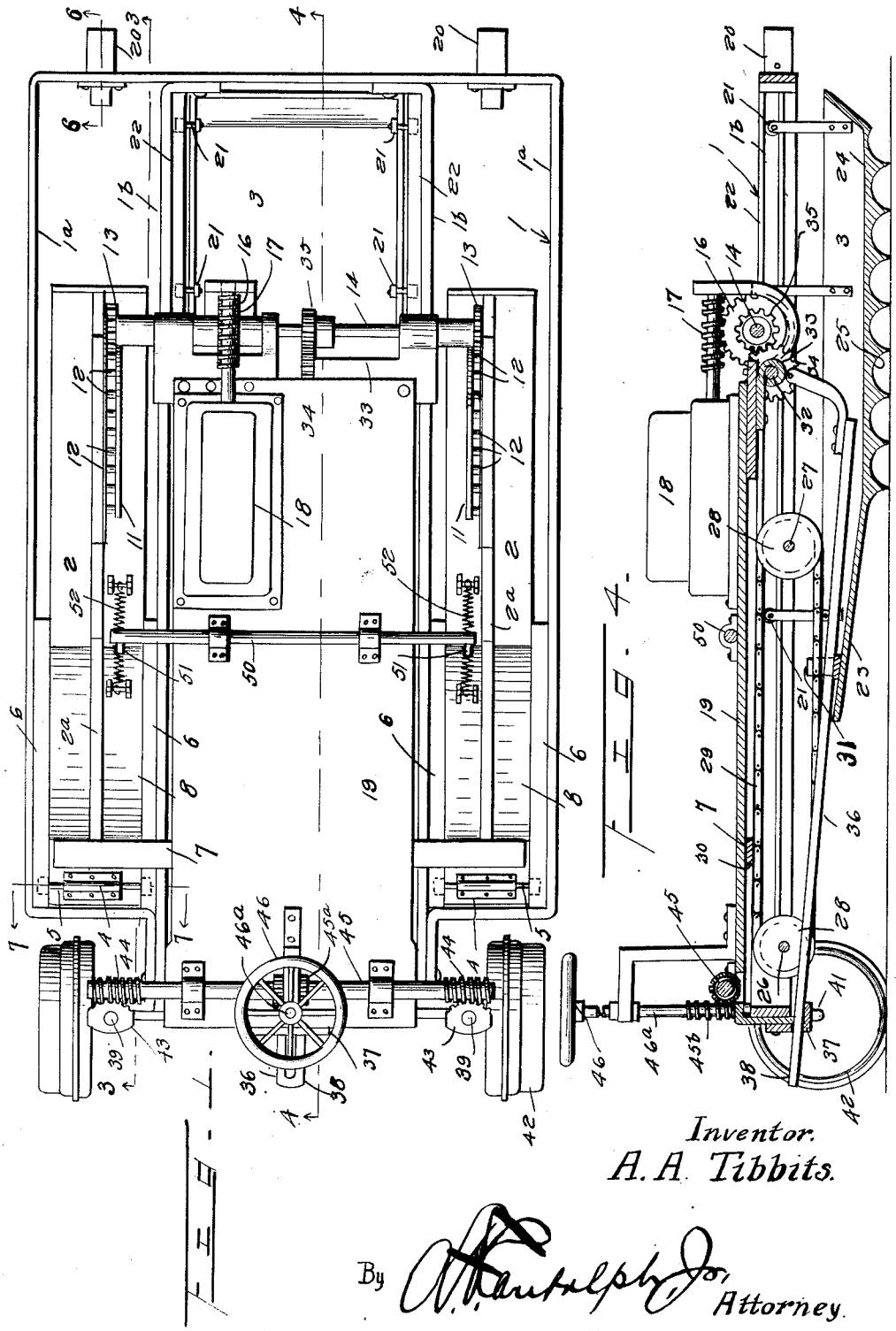

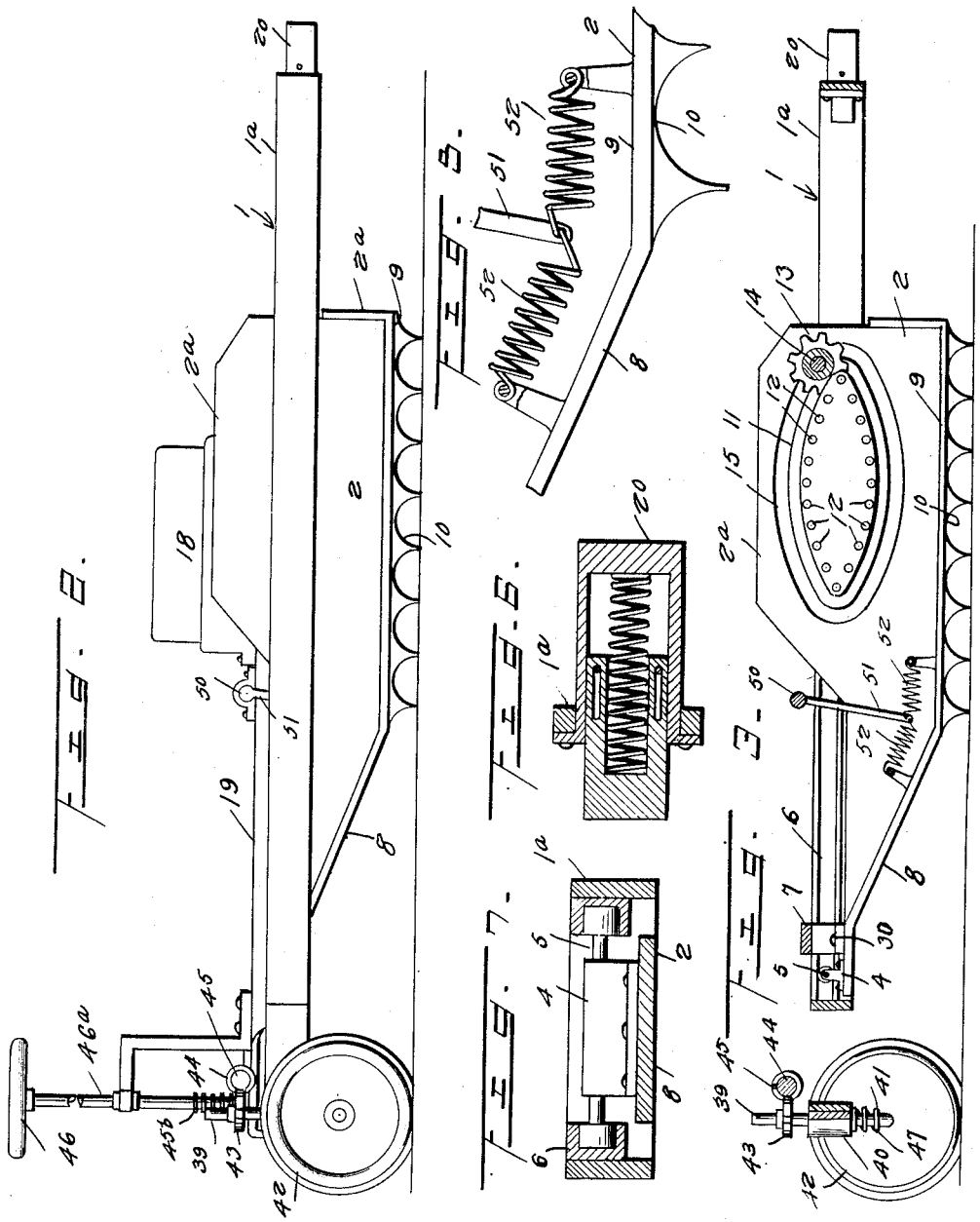

ARMAND A. TIBBITS, OF OMAHA, NEBRASKA.

TRACTOR.

1,326,805.	Specification of Letters Patent.	Patented Dec. 30, 1919.

Application filed June 13, 1919. Serial No. 304,021.

*To all whom it may concern:*

Be it known that I, ARMAND A. TIBBITS, a citizen of the United States, residing at Omaha, in the county of Douglas and State of Nebraska, have invented certain new and useful Improvements in Tractors; and I do hereby declare the following to be a full, clear, and exact description of the invention, such as will enable others skilled in the art to which it appertains to make and use the same.

This invention relates to tractors, and more particularly to a tractor of what is termed the walking type.

One of the main objects of the invention is to provide a tractor of the character stated possessing comparatively great power and well adapted for travel over rough surfaces, this tractor being of comparatively simple construction and operation. A further object is to provide a tractor having sufficient speed and power to be used for hauling, plowing, and similar purposes. Further objects will appear from the detailed description.

In the drawings:

Figure 1 is a top plan view of a tractor constructed in accordance with my invention.

Fig. 2 is a side view.

Fig. 3 is a section taken substantially on line 3—3 of Fig. 1.

Fig. 4 is a section taken substantially on line 4—4 of Fig. 1.

Fig. 5 is a detail of the hinge mounting of one of the side steppers.

Fig. 6 is a sectional detail of one of the spring bumpers.

Fig. 7 is a section taken substantially on line 7—7 of Fig. 1.

The primary object of this invention is to simplify and improve generally the construction of the tractor disclosed in my prior United States Patent Number 1,306,644, issued June 10, 1919.

The tractor is provided with a main frame designated generally by 1 which is composed of substantially rectangular side frames $1^a$ and a central rectangular frame $1^b$ of slightly greater length and breadth than the side frames. The side frames $1^a$ and the central frame $1^b$ are constructed to provide housings or casings for lateral stepping members 2 and a central member 3, respectively. Each of the members 2 is provided at its rearward end with a bracket 4 extending transversely thereof through which is passed a rod 5 the ends of which are provided with rollers slidable in horizontally disposed channel guide member 6 secured to the inner walls of the stepper housing. This rod and the guide members coöperate to provide sliding and pivotal connections between the stepping member and the frame so as to permit reciprocation of this member longitudinally of the frame and rocking movement of the stepping member in a vertical plane about an axis extending transversely of the frame. The two stepping members are connected, adjacent their rearward ends, by a transverse bar 7 secured to the upper edges thereof, each of these members being provided with a central vertical web $2^a$ and having its bottom inclined upwardly and rearwardly at the rearward portion thereof, as at 8. The forward horizontal portion 9 of the bottom of the stepping member is transversely corrugated on its under face to provide transversely extending gripping elements or ribs 10.

A substantially elliptical guide frame 11 is secured to the inner face of the web member $2^a$, and is provided with a plurality of horizontally disposed rollers 12 which are spaced apart and are adapted to be engaged by the teeth of a pinion 13 secured upon drive shaft 14 which is rotatably mounted in frame 1 transversely thereof. Shaft 14 projects beyond the pinion and engages inside of a flange 15 provided on the frame 11 for maintaining the pinion in proper engagement with the rollers 12. Shaft 14 is further provided with a worm gear 16 secured thereon within the central frame $1^b$ and meshing with a drive worm 17 rotated by an internal combustion engine 18 supported upon a platform 19 extending across the frame at the medial portion thereof and secured thereto. During rotation of drive shaft 14, the pinions 13 due to their engagement with the rollers 12 of frame 11 serve to rock the steppers 2 upwardly and forwardly out of engagement with the traction surface, these steppers being then moved forwardly in the frame 1 and lowered into engagement with the ground surface, the travel of the pinions 13 upon the upper rollers serving to rock the frame 1 upwardly and move it forwardly, thus advancing the frame by a step motion. Each of the side frames $1^a$ is provided at each end with a spring bumper 20 of suitable type which is so positioned as to be engaged by the ends of the steppers 2 during the reciprocation thereof, these members serving to limit movement of the steppers in either direction or, more correctly stated, to retard movement of the stepper so as to absorb all jars incident to a change in direction of movement of the steppers.

The central stepper 3 is provided with a plurality of brackets carrying rollers 21 rotatably mounted thereon which fit into channel guide members 22 secured to the inner faces of the side beams of this frame. These rollers and guide members coöperate to permit horizontal reciprocation of the central stepper longitudinally of the frame while maintaining this central stepper in predetermined relation to the plane of the frame. The rearward end portion of central stepper 3 is also inclined upwardly and rearwardly as at 23 similarly to the upward and rearward inclination of the rearward portion of the side steppers 2, the under face of the horizontal portion 24 of the bottom of this central stepper being also transversely corrugated to provide transversely extending gripping elements 25. A shaft 26 is rotatably supported by central frame 1$^b$ substantially at the longitudinal center thereof in spaced relation to a parallel shaft 27 rotatably supported in the frame adjacent the rearward end thereof. Each of these shafts is provided with two grooved pulleys 28 loose thereon, the pulleys of the respective shafts being in alinement longitudinally of the frame and being connected by suitable chains 29 passed about the same. The upper runs of these chains are secured to bar 7, as at 30, and the lower runs of these chains are secured to the rearward end of central stepper 3 as at 31. When the lateral steppers 2 are on their idle or inactive stroke and are being moved forwardly out of engagement with the traction surface, relative to the main frame, the forward movement of bar 7 with these lateral steppers will serve to also cause forward movement of the frame 1 of the tractor so as to advance the same. During the forward movement of the lateral steppers on their inactive or idle stroke, the consequent advancement of frame 1, which will slide upon the rods 21 of the central stepper 3, will bring this central stepper into position adjacent the rearward end of the central frame 1$^b$. During the active stroke of the lateral steppers, which is when the pinions 13 are traveling upwardly over the upper rollers 12, the central stepper frame 1$^b$ and the central stepping member 3 carried thereby are raised bodily and advanced so as to bring the lateral stepping members 2 into the positions illustrated in Fig. 1. This forward movement of the frame, due to the connections between the lateral stepping members and the central stepping members, and the fact that these lateral stepping members are in engagement with the traction surface, or anchored, serves to return the central stepping member 3 to its forward or initial position, as illustrated. By this means, the tractor is advanced by a stepping movement at a sufficiently high speed to enable it to be used for traction purposes.

A stub shaft 32 is rotatably supported in a bracket 33 depending from the platform. A spur gear 34 is secured on this stub shaft and meshes with a spur pinion 35 secured on drive shaft 14. A pull bar 36 is pivoted to the inner face of gear 34 eccentrically thereof, this pull bar being slidable through a guide bracket 37 depending from the rear end bar of frame 1$^b$ and being provided at its outer end with an attaching loop or eye 38. The pinion and gear are so related and timed that the pull bar 36 will be moved forwardly during the interval between the forward movements or steps of the frame 1, thus insuring an even and uniform pull upon the load.

A standard 39 is pivotally mounted in a bearing sleeve 40 secured on the rearward end of each of the side frames 1$^a$ and is provided at its lower end with a spindle 41 on which is rotatably supported a ground wheel 42. A segment 43 is secured on the upper end of the standard and meshes with a worm 44 carried by a shaft 45 rotatably supported upon the platform and having a worm wheel 45$^a$ meshing with a worm 45$^b$ of a shaft 46$^a$, this shaft being provided with a steering wheel 46 of suitable type.

By rotating shaft 45 in proper direction, the tractor may be steered in the well known manner, the ground wheels 42 being held in engagement with the traction surface by expansion coil springs 47 mounted about the standards 39 and confined between spindles 41 and bearing sleeves 40, it being understood that the segments 43 are of sufficient width across their faces to permit this vertical movement of the standards without disengaging the segments from their coöperating worms.

A rod 50 is rockably mounted upon the platform 19 transversely thereof. This rod projects beyond the sides of the platform and is provided at each end with a depending arm 51 the lower end of which is secured to the central portion of a coil spring 52 having its ends secured to the bottom of stepper 2. This rod and the springs coöperate to cushion the movement of the steppers so as to reduce jar and vibration to a minimum.

What I claim is:

1. In a tractor, a main frame, lateral steppers slidably and pivotally mounted therein, a central stepper slidably connected to the main frame, means for raising the lateral steppers out of engagement with the traction surface and for advancing the same relative to the frame and for simultaneously advancing the frame upon said central stepper, said means being adapted to then lower the lateral steppers into engagement with the traction surface and advance the frame upon said lateral steppers and simultaneously return the central stepper to its initial position within the frame.

2. In a tractor, a main frame, lateral steppers slidably and rockably mounted in said frame, a central stepper slidably mounted in the frame, a drive shaft, connections between the drive shaft and said lateral steppers for alternately raising said steppers and advancing the same relative to the frame and lowering the steppers into engagement with the traction surface and advancing said frame upon the steppers, and connections between said central stepper and the lateral steppers and the frame for advancing the frame relative to the central stepper and at less speed than the speed of advancement of the lateral steppers when said lateral steppers are advanced, and for advancing said central stepper relative to the frame when said frame is advanced upon the lateral steppers.

In testimony whereof I affix my signature in presence of two witnesses.

ARMAND A. TIBBITS.

Witnesses:
 Jos. J. FITZGERALD,
 A. H. MURDOCK.